United States Patent [19]

Ohkuma et al.

[11] Patent Number: 5,010,537
[45] Date of Patent: Apr. 23, 1991

[54] OPTICAL DISC DEVICE WITH MULTI-HEAD SLIDER AND TRACKING CONTROL

[75] Inventors: Hiroya Ohkuma, Tokyo; Satoru Sanada, Yokohama, both of Japan

[73] Assignee: Nikon Corporation, Tokyo, Japan

[21] Appl. No.: 222,036

[22] Filed: Jul. 21, 1988

[30] Foreign Application Priority Data

Jul. 27, 1987 [JP] Japan ................. 62-187236
Sep. 24, 1987 [JP] Japan ................. 62-239797

[51] Int. Cl.⁵ .............................................. G11B 7/00
[52] U.S. Cl. .................................. 369/44.32; 369/54
[58] Field of Search ............................. 369/43–46, 369/109, 110, 122, 44.11, 44.32, 44.33, 54, 58, 111, 100, 270, 286

[56] References Cited

U.S. PATENT DOCUMENTS

| | | | |
|---|---|---|---|
| 4,167,024 | 9/1979 | Hamisch | 369/110 X |
| 4,520,472 | 5/1985 | Reno | 369/122 X |
| 4,566,090 | 1/1986 | Eberly | 369/54 X |
| 4,578,786 | 3/1986 | McIntosh et al. | 369/111 |
| 4,589,102 | 5/1986 | Volleau et al. | 369/46 |
| 4,674,078 | 6/1987 | Otsuka et al. | 369/44.32 |
| 4,726,004 | 2/1988 | Takesago et al. | 369/46 |
| 4,761,776 | 8/1988 | Opheij | 369/54 |
| 4,780,865 | 10/1988 | Yamakawa | 369/54 |
| 4,858,218 | 8/1989 | Takagi et al. | 369/109 |

FOREIGN PATENT DOCUMENTS 61-68742 4/1986 Japan .

*Primary Examiner*—Donald McElheny, Jr.
*Attorney, Agent, or Firm*—Shapiro and Shapiro

[57] ABSTRACT

In an optical disc device, a plurality of heads provided with actuator means for inclining the direction of application of a beam applied to the surface of a disc within a predetermined range are secured onto a slider movable in the radial direction of the disc, and provision is made of detecting means for detecting the positions or the tracking errors of the beams of the plurality of heads, and slider control means for position-controlling the slider on the basis of the detection signal of the detecting means so that the directions of application of the beam spots by the actuator means are in a predetermined relation.

10 Claims, 5 Drawing Sheets

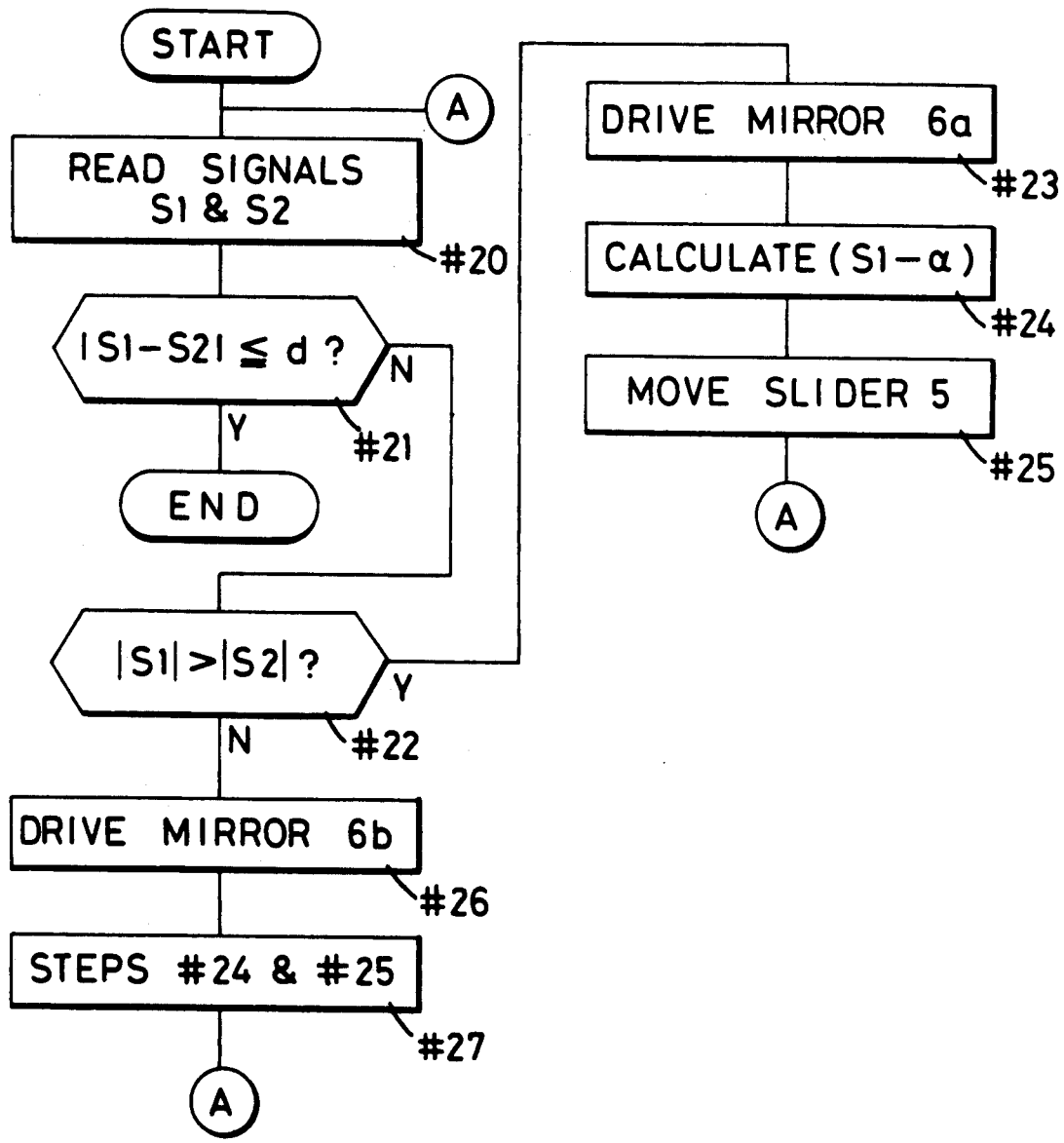

OPTICAL DISC DEVICE WITH MULTI-HEAD SLIDER AND TRACKING CONTROL

BACKGROUND OF THE INVENTION

1. Field of the Invention

This invention relates to a track follow-up control apparatus for an optical disc device having a plurality of heads carried on a common slider.

2. Related Background Art

In a track follow-up control apparatus for an optical disc device, a head provided with a tracking actuator capable of scanning a light beam on the surface of an optical disc radially thereof by the driving of a galvano mirror or the like is carried on a slider movable in the radial direction of the optical disc, and position control of the slider and the control of the tracking actuator of the head are effected simultaneously, whereby two-step servo tracking control in which the light beam is caused to follow a desired track is accomplished.

Taking as an example a slider control employing a sense signal which detects the inclination of a beam, the position of the slider is controlled on the basis of the sense signal after the access of a desired track while, on the other hand, for any variation in the track position which cannot be followed by the slider position control, track following is controlled on the basis of a tracking error signal (a signal which detects how much the light beam deviates from the desired track) by driving a galvano mirror by a tracking actuator provided on a head, whereby the light beam is caused to precisely follow the desired track.

Also, in a slider control employing a tracking error signal, a light beam is caused to follow a track by the slider position control for a lengthy variation in the track position which is attributable to the eccentricity of the optical disc, in addition to the predetermined position control of the slider based on a sense signal, while for a brief variation in the track position, an amount which cannot be followed in the slider position control is made up for by the driving of the galvano mirror by the tracking actuator provided on the head, whereby the light beam is caused to precisely follow a track.

SUMMARY OF THE INVENTION

It is an object of the present invention to provide an optical disc device in which a plurality of heads are carried on a common slider and a plurality of beams applied from the plurality of heads to a disc are controlled in a predetermined relation.

To achieve this object, according to the present invention, a plurality of heads provided with actuator means for inclining the direction of application of a beam applied to the surface of a disc within a predetermined range are secured to a slider movable radially of the disc. Detecting means detects the positions and the tracking errors of the beams of the plurality of heads, and control means responsive to detection signals of the detecting means controls directions of application of the beams so that they are in a predetermined relation.

The present invention is further designed such that when the numbers of tracks are to be written into the tracks of an optical disc having tracks already formed thereon, the spacings between a plurality of beams applied from a plurality of heads provided on a common slider to the optical disc are controlled so as to be in a predetermined relation.

BRIEF DESCRIPTION OF THE DRAWINGS

FIG. 5 is a flow chart showing the operation of the further embodiment of the present invention.

DESCRIPTION OF THE PREFERRED EMBODIMENTS

Figure 1:
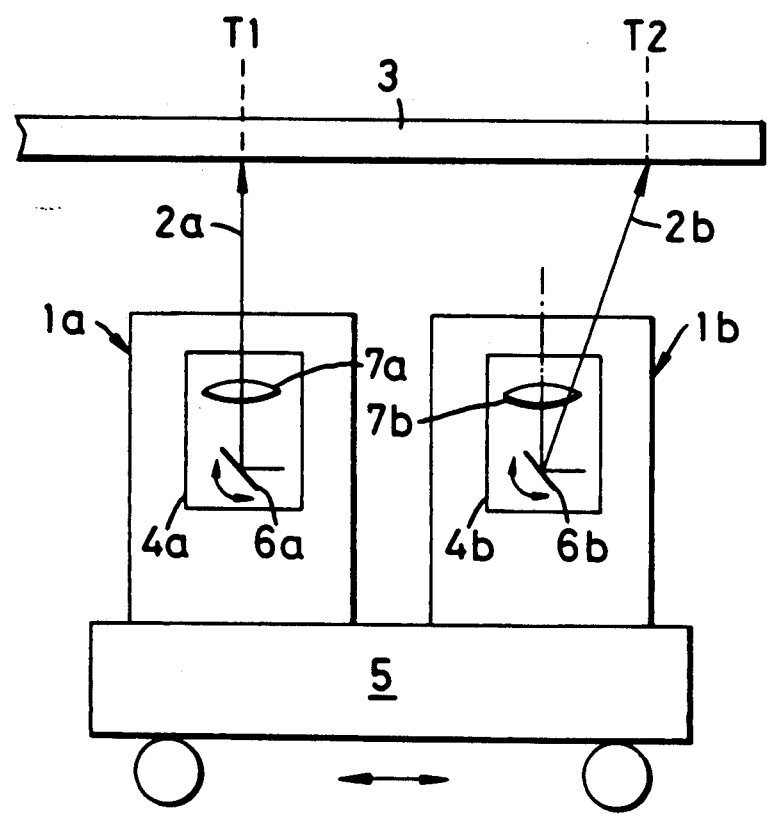
FIG. 1 is a schematic view illustrating the principle of apparatus to which the present invention is applicable.

In FIG. 1, the reference numeral 3 designates an optical disc which may be an optical disc having information recorded thereon by physical concavoconvex pits or a magneto-optical disc having information bits recorded thereon by vertical direction magnetization. Recording tracks are concentrically or spirally formed on the disc surface of the optical disc 3.

The reference numeral 5 denotes a slider which is installed for movement in the diametrical direction of the optical disc 3 by a voice coil type linear motor or the like, not shown. Two heads 1a and 1b are carried on the slider 5. Apparatus having s slider provided with a plurality of heads is disclosed in U.S. Ser. No. 172,678 (filed on Mar. 24, 1988) by the assignee of the present invention.

Galvano mirrors 6a and 6b for moving a beam spot radially of the optical disc 3 are incorporated in the heads 1a and 1b, respectively, and light beams 2a and 2b converged by objective lenses 7a and 7b are applied thereto. The optic axes of the objective lenses 7a and 7b are substantially parallel to each other in a plane substantially radially of the optical disc 3 and are substantially perpendicular to the surface of the optical disc 3.

If, as described above, two heads are carried on the same slider and the optical disc device is designed such that the light beams of the respective heads follow two tracks at a time, the information write-in and read-out speeds will be improved.

In an optical disc device wherein two heads are thus carried on a slider, as shown, for example, in FIG. 1, the light beam 2a from the head 1a is caused to follow the track T1 of the optical disc 3 and at the same time, the light beam 2b from the head 1b is caused to follow a different track T2 of the optical disc 3. As regards the control of the slider 5 for the track follow-up in this case, for example, a sense signal for detecting the position of the head 1a is used to control the slider 5 so that the light beam 2a from the head 1a lies right below the track T1. At the same time, track follow-up control is effected in which the galvano mirrors 6a and 6b contained in the heads 1a and 1b, respectively, are driven on the basis of tracking error signals of the light beams 2a and 2b relative to the tracks T1 and T2 to control the directions of the light beams 2a and 2b, and the light beams 2a and 2b are caused to precisely follow the tracks T1 and T2, respectively, of the optical disc 3. Such rough tracking control by the slider and such fine tracking control by the galvano mirrors are together called fine control.

However, in such a track follow-up control device, if the slider is controlled to a position based on the sense signal representative of the inclination of one beam when the track control of the heads is being effected, where the positions of the tracks accessed by the heads 1a and 1b deviate greatly from each other, the slider 5 is position-controlled by the sense signal, for example, of the head 1a and therefore, the movement of the galvano mirror 6a which causes the light beam 2a of the head 1a to follow the track T1 is small, while the galvano mirror 6b in the other head 1b which does not use the sense signal for the position control of the slider 5 must be greatly swung.

Thus, the light beam from the galvano mirror 6b is converged at a marginal position off the center of the optic axis of the objective lens 7b and forms a beam spot on the optical disc 3, and the astigmatism caused by the convergence of the light beam 2b becomes great and also the movement of the galvano mirror 6b becomes great and therefore, mechanical loss increases and control accuracy is reduced and thus, highly accurate tracking control cannot be accomplished on the head 1b side.

Figure 2:
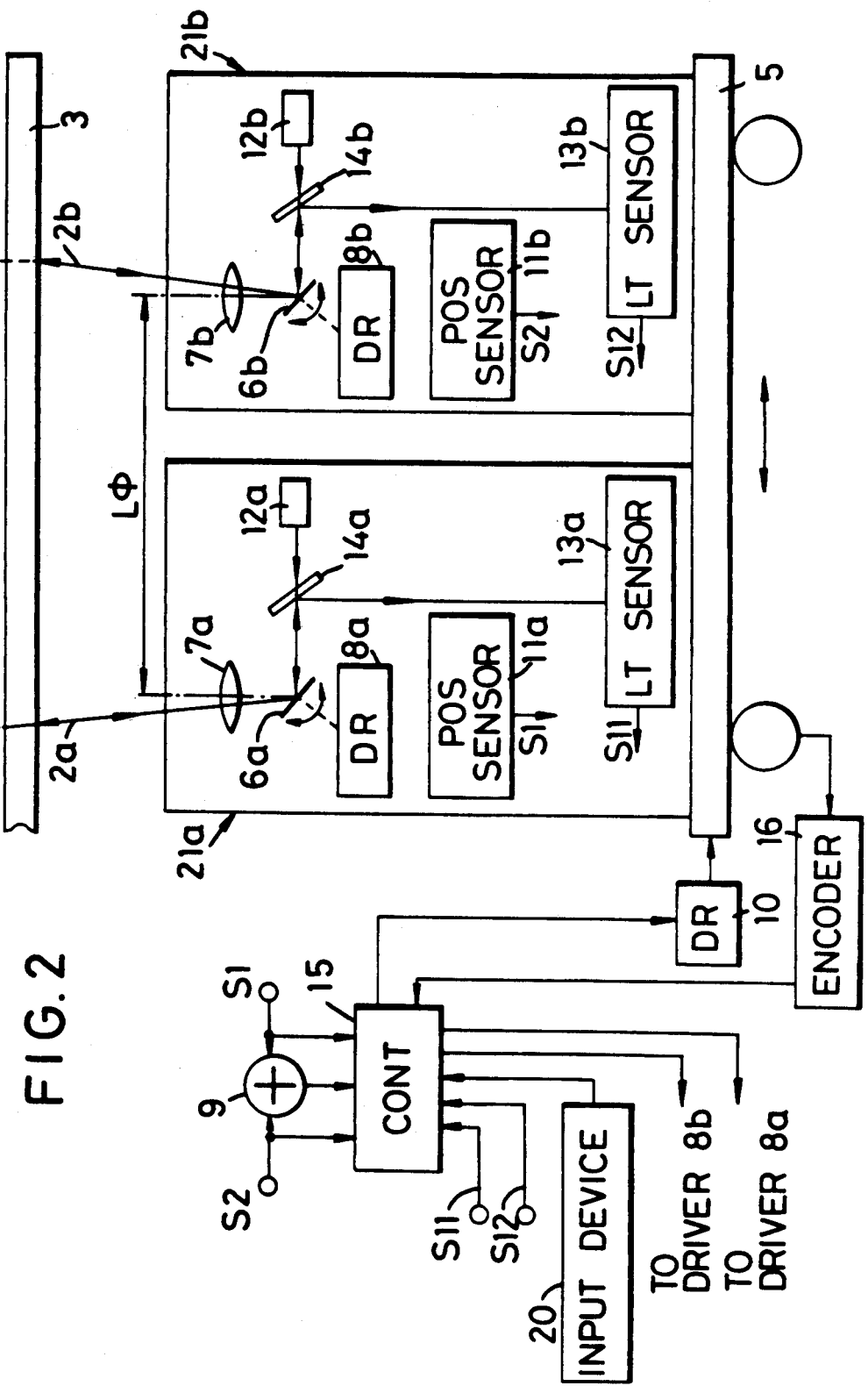
FIG. 2 is a schematic diagram illustrating an embodiment of the present invention.

An embodiment of the present invention will now be described with reference to FIG. 2. In FIG. 2, reference characters similar to those in FIG. 1 designate similar members.

Drivers 8a and 8b for driving the galvano mirrors 6a and 6b, with a predetermined position in the range of movement of the slider 5 as a reference, and position sensors 11a and 11b for detecting the angles of rotation of the galvano mirrors 6a and 6b are provided in heads 21a and 21b, respectively, and sense signals S1 and S2 indicative of the inclinations of beams 2a and 2b, respectively, in a radial plane containing the optical axes of lenses 7a and 7b (separated by distance $L\phi$) are output from the position sensors 11a and 11b. The reference characters 12a and 12b designate laser sources, and the reference characters 13a and 13b denote light sensors for detecting the reflected light from the disc 3 through halfmirrors 14a and 14b.

The sense signals S1 and S2 from the position sensors 11a and 11b provided in the heads 21a and 21b are added together by an adder 9, and the addition signal (S1+S2) is input to a control circuit 15. The control circuit 15 controls a driver 10 so that in the track follow-up control after the termination of the access of the heads 21a and 21b to desired tracks, the slider 5 lies at a position which provides the mean value (S1+S2)/2 of the addition signal obtained from the adder 9.

The driver 10 moves the slider 5 in the direction of the arrow in accordance with the output of the control circuit 15, and an encoder 16 detects the position of the slider 5 and outputs a signal indicative of the detected position to the control circuit 15.

Figure 3:
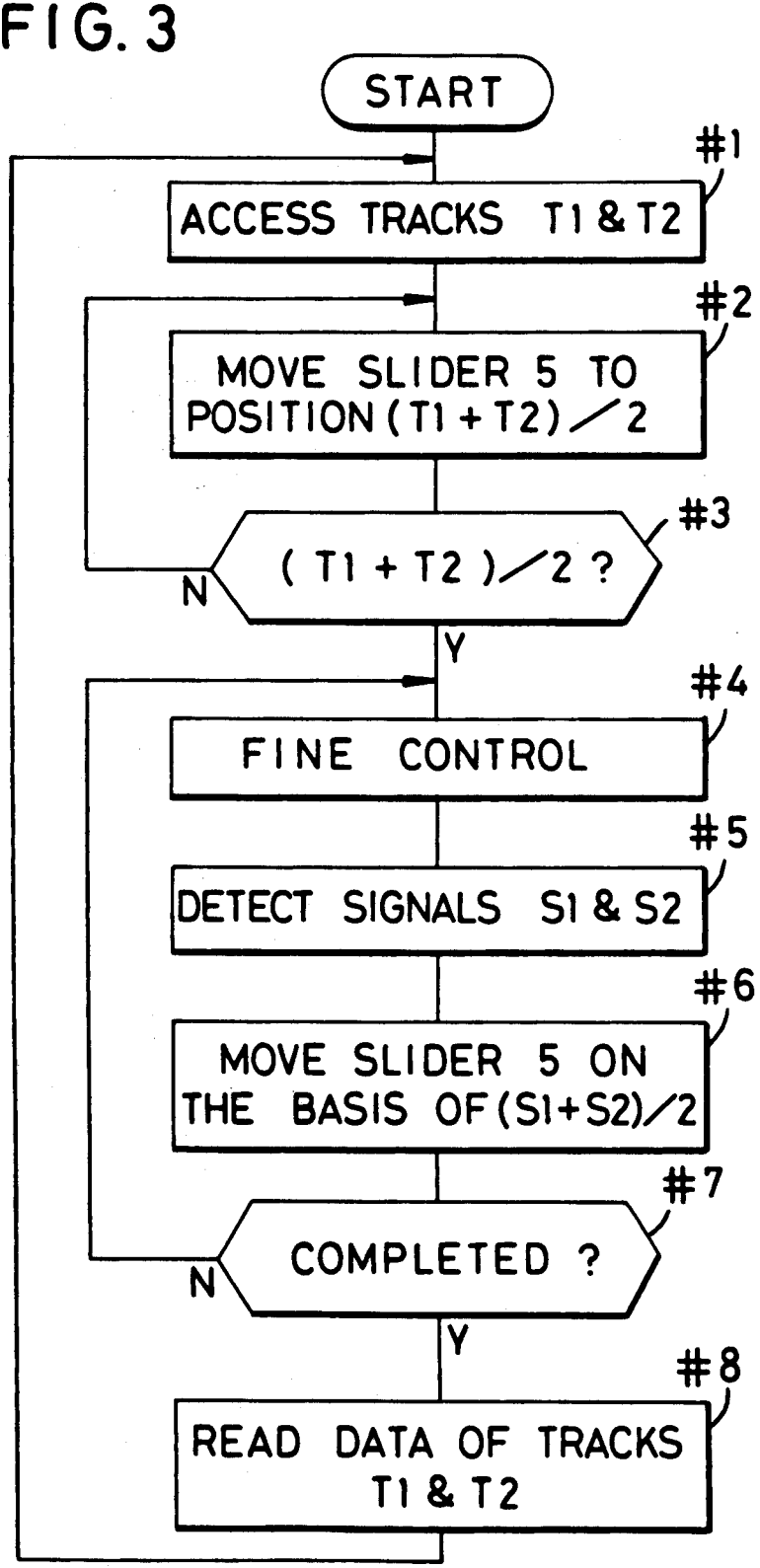
FIG. 3 is a flow chart showing the operation of the embodiment of FIG. 2.

Reference is now had to the flow chart of FIG. 3 to describe the track follow-up control by the embodiment of FIG. 2.

Referring to FIG. 3, at step #1, the access of tracks T1 and T2 (separated by distance L) by the heads 21a and 21b is commanded from an input device 20. The command to access tracks T1 and T2 is designated, for example, as the number of tracks from the reference position of the optical disc 3.

When the command to access tracks T1 and T2 is received at step #1, the control circuit 15 controls the driver 10 and moves the slider to the mean track position (T1+T2)/2 of the tracks T1 and T2 on the basis of the output of the encoder 16, as shown at step #2, and when the mean track position is reached at step #3, the access control is terminated and the fine control of step #4, based on track error signals S11 and S12 which are the outputs of the light sensors 13a and 13b, is effected. A track follow-up control is disclosed in Japanese Laid-Open Patent Application No. 61-68742 by the assignee of the present invention, and this Japanese patent application corresponds to U.S. application Ser. No. 772,473 (filed on Sept. 4, 1985), now U.S. Pat. No. 4,858,218, issued Aug. 15, 1989. The light sensors 13a and 13b are provided with two light-receiving elements for detecting the tracking error, and in addition, at least one light-receiving element for reproducing the information recorded on the disc 3.

The track follow-up control of the heads 21a and 21b based on the track error signals at step #4 is effected so that light beams 2a and 2b are applied to the tracks T1 and T2 accessed by the slider 5, a track error is calculated from the track position information obtained by receiving the reflected light or the diffracted light from the tracks, and the galvano mirrors 6a and 6b are driven by drivers 8a and 8b so as to eliminate the track error, whereby the light beams 2a and 2b are caused to precisely follow the tracks T1 and T2.

As shown at the next step #5, the sense signals S1 and S2 from the position sensors 11a and 11b are detected, and at step #6, the mean value (S1+S2)/2 of the sense signals S1 and S2 is found. Here, the sense signals S1 and S2 are determined so that (S1+S2) is zero when the beams 2a and 2b are oppositely inclined by the same angle with respect to the optic axes of the respective lenses. The signal input from the control circuit 15 to the driver 10 corresponds to the mean value (S1+S2)/2. In step #6 control circuit 15 controls the driver 10 so that the amount of movement of the slider 5 is this mean value, and the fine control of step #4 and the slider control for keeping the slider 5 at an intermediate position between the tracks T1 and T2 by the sense signals S1 and S2 are effected at the same time until the tracking of the heads 21a and 21b is completed at step #7. At step #8, the information from the tracks T1 and T2 is read in.

In the position control of the slider 5 during the tracking control based on such sense signals S1 and S2, if the movement of the galvano mirrors 6a and 6b by the track error signal is neglected, the position control of the slider 5 is effected to such a position that the inclinations of the galvano mirror 6a of the head 21a and the galvano mirror 6b of the head 21b become substantially the same. The tracks are not complete circles, due to variations when the tracks are formed on the disc, but are generally formed so as to wave radially of the disc. Accordingly, at step #6 and subsequent steps also, the galvano mirrors 6a and 6b fluctuate somewhat.

Accordingly, even if the tracks T1 and T2 are greatly spaced apart from each other, as compared with the case where the slider 5 is positioncontrolled on the basis, for example, of only the sense signal of the head 21a, the movement of the galvano mirror 6b of the other head 21b decreases to half. As described above, in the present embodiment, occurrence of astigmatism is suppressed by the convergence of the beams and the movement of the galvano mirrors 6a and 6b is small and therefore, the error resulting from a mechanical loss is also small and highly accurate track follow-up control can be realized on the basis of the tracking error signals.

Also, in another embodiment of the present invention, it is possible to drive the slider 5 on the basis of the tracking error signals S11 and S12 of the heads 21a and 21b obtained during the tracking control. Again in this case, as in the case of the sense signals, the slider 5 is position-controlled according to the mean value (S11+S12)/2 of the tracking error signals S11 and S12 of the heads 21a and 21b, whereby the inclinations of the galvano mirrors 6a and 6b (the inclinations of the beams 2a and 2b) can be made substantially the same. In the position control of the slider 5 by the tracking error signals, with regard to the tracking error signal based on a change in the track position which is brief, the slider 5 cannot follow and therefore, it is desirable to find the mean value after the tracking error signals have been integrated, and position-control the slider 5 on the basis of a tracking error signal which is slow.

Although the above-described embodiment has been shown as an example in which two heads 21a and 21b are carried on the slider 5, the present invention is not restricted thereto, and three or four heads may be carried on the slider 5. Where three or more heads are thus carried on the slider 5, the slider 5 is position-controlled on the basis of the mean value of the sense signals or the tracking error signals of all heads.

Further, in the flow chart of FIG. 3, in steps #1 to #3 the slider 5 is moved to the intermediate position between the tracks T1 and T2 to thereby shift to the track follow-up control, but alternatively, as in in FIG. 1, the slider 5 may be moved on the basis of a sense signal indicative of the head position which is obtained by the track access of a particular head, to thereby shift to the track follow-up control shown at steps #4–#7 after the termination of this access. In such case, the slider 5 is moved to a position determined by the sense signal S1 from the position sensor 11a which corresponds, for example, to the track T1 of the head 21a shown in FIG. 2, and at this time, the light beam 2b of the other head 21b accesses the track T2 and thus, the galvano mirror 6b is greatly swung, but when shift is made to the track follow-up control after the termination of the access, shift is made to the position control of the slider 5 based on the mean value of the sense signals S1 and S2 from the position sensors 11a and 11b, whereby the slider 5 is returned to a position in which the movements of the galvano mirrors 6a and 6b are the same.

The principle of a further embodiment of the present invention will now be described. Generally, an optical disc device like the present invention is required to have not only the function of reproducing information recorded on the tracks of the optical disc, but also the function of recording the numbers of the tracks and other data on the tracks of the optical disc. The further embodiment of the present invention relates to the recording on the disc in which the track numbers are not written, i.e., before formatting.

Figure 4A:
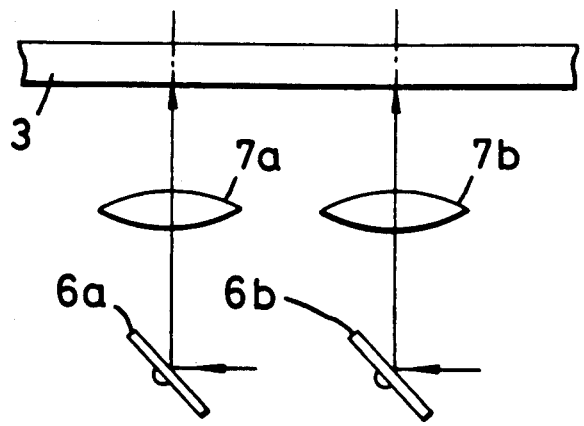
FIGS. 4A, 4B and 4C illustrate the principle of a further embodiment of the present invention.
Figure 4B:
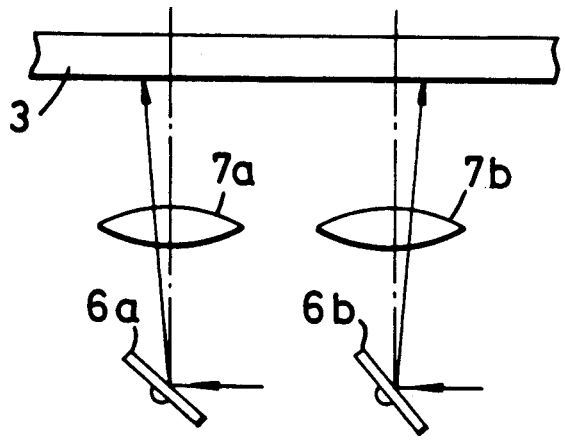
Figure 4C:
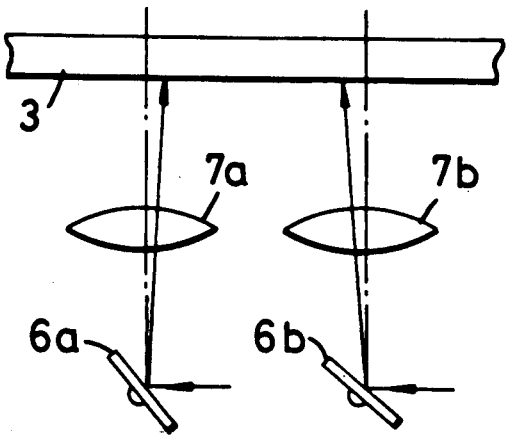

In a device having a plurality of optical heads on a slider, like the device of the present invention, when the numbers of the tracks are to be recorded on the optical disc, it is more efficient for the plurality of optical heads to record the track numbers on a plurality of tracks simultaneously. During the recording of the track numbers, the state of the light beam applied from each head to the disc should originally be such as shown in FIG. 4A, but there is the possibility of a problem in which as shown in FIG. 4B or 4C, the spacing on the disc between the light beams applied from the respective heads to the disc differs from the spacing between the centers of the objective lenses of the respective heads. This problem will be referred to hereinafter.

During the recording of the track numbers on the disc before formatting, and regarding the above-noted problem, it is better to fix the galvano mirror of each optical head, and for that purpose, the drivers for the galvano mirrors may be controlled so as not to be driven. However, the galvano mirror may assume a state as shown in FIG. 4B or 4C due to e.g., the sway of the galvano mirrors caused by movement of the slider, and/or the irregularity of the reference position of the galvano mirror of each head (the position of the galvano mirror when the driver therefor is not driven).

If an attempt is made to record the track numbers on the disc in a state as shown in in which the light beam does not enter the disc 3 perpendicularly thereto, the optical characteristic is degraded as compared with the case of FIG. 4A and thus recording and reproduction on the optical disc will be hindered.

The improved embodiment of the present invention will hereinafter be described with reference to FIG. 5.

The control circuit 15, at step #20, reads in signals S1 and S2 from the position sensors 11a and 11b, and at step #21, judges whether the absolute value of the difference between the signals S1 and S2 is a predetermined value d or less, and if the absolute value of the difference between the signals S1 and S2 is a predetermined value d or less, the control circuit terminates its operation, and if not so, shift is made to step #22. At step #22, the absolute value of the signals S1 and S2 are compared. If the absolute value of signal S1 is greater than that of the signal S2, the galvano mirror 6a is driven so that the beam 2a is moved in an amount and in a direction which conform to the difference between the signals S1 and S2 found at step #21. At step #24, the difference between the value $\alpha$ of the signal S1 when the beam 2a enters the disc perpendicularly thereto and the actual signal S1 is calculated, and at step #25, the slider 5 is moved on the basis of the value calculated at step #24. When the slider 5 is being moved at step #25, the tracking control by the galvano mirror of each head is being effected. Accordingly, after the termination of the movement of the slider 5, the incidence of the beams 2a and 2b onto the disc becomes substantially perpendicular thereto. If at step #22, it is judged that the absolute value of signal S1 is smaller than that of the signal S2, shift is made to step #26, where the galvano mirror 6b is driven so that the beam 2b is moved by an amount and in a direction which conform to the difference between the signals S1 and S2 found at step #21. Step #27 operates similarly to steps #24 and #25.

What is claimed is:

1. In an apparatus for writing information to or reading information from a disc-like recording medium having a plurality of tracks formed thereon,
    (a) slider means radially movable along said recording medium;
    (b) a pair of head means on said slider means, each of said head means having an optical system for applying a light beam to said recording medium, said optical systems having respective optic axes that are substantially parallel to each other in a plane substantially radially of said recording medium, said optical systems having means for adjusting the inclination of the light beams in said plane relative to said optic axes, respectively; and
    (c) control means for controlling the position of said slider means radially of said recording medium relative to a designated pair of said tracks and for controlling said inclination adjusting means so that said light beams are applied to the tracks of said pair of tracks, respectively, with substantially equal inclinations of said light beams.

2. An apparatus according to claim 1, wherein said optic axes are substantially perpendicular to a surface of said recording medium and said inclinations of said beams are directed substantially opposite to each other.

3. An apparatus according to claim 1, wherein said control means comprises positioning means for maintaining said slider means at a position substantially midway between the tracks of said pair of tracks.

4. An apparatus according to claim 3, wherein said control means comprises means for detecting the inclinations of said beams, respectively, and wherein said positioning means is responsive to said detecting means.

5. An apparatus according to claim 1, wherein said control means comprises tracking error detecting means responsive to light from said recording medium for controlling said inclination adjusting means.

6. An apparatus according to claim 1, wherein said control means comprises means for sensing the positions of said pair of head means relative to the tracks of said pair of tracks, respectively, and means for controlling the position of said slider means relative to said pair of tracks, accordingly.

7. Apparatus according to claim 1, wherein said inclination adjusting means comprises, for each head means, a corresponding galvano mirror and means for driving the galvano mirror.

8. Apparatus according to claim 7, wherein said control means comprises means for detecting the inclinations of said beams, respectively, and controls said inclination adjusting means in response to said detecting means so that said light beams are substantially perpendicular to a surface of said recording medium.

9. Apparatus according to claim 8, wherein said control means compares detected inclinations of said beams with each other and adjusts the larger detected inclination.

10. In apparatus for writing data into tracks of a disc-like recording medium having a plurality of tracks formed thereon,
 (a) slider means radially movable along said recording medium;
 (b) a pair of head means on said slider means, each of said head means having an optical system for applying a light beam to said recording medium, said optical systems having respective optic axes that are substantially parallel to each other in a plane substantially radially of said recording medium, said optical systems having means for adjusting the inclination of the light beams in said plane relative to said optic axes, respectively; and
 (c) control means for controlling said inclination adjusting means so that said light beams are parallel to each other.

* * * * *